United States Patent [19]
Seal

[11] Patent Number: 6,035,383
[45] Date of Patent: Mar. 7, 2000

[54] MEMORY ACCESS REQUEST RESULT PREDICTION PRIOR TO CONFIRM SIGNAL GENERATION

[75] Inventor: David James Seal, Cambridge, United Kingdom

[73] Assignee: Arm Limited, Cambridge, United Kingdom

[21] Appl. No.: 08/962,832

[22] Filed: Nov. 3, 1997

[51] Int. Cl.[7] ................................. G06F 9/38
[52] U.S. Cl. ............... 711/213; 711/204; 711/137; 712/233; 712/207; 712/237; 712/236; 712/239
[58] Field of Search ................. 711/137, 204, 711/213; 712/233, 207, 236, 237, 239

[56] References Cited

U.S. PATENT DOCUMENTS

| | | | |
|---|---|---|---|
| 4,583,162 | 4/1986 | Prill | 711/213 |
| 4,729,092 | 3/1988 | Lupton | 711/213 |
| 4,819,234 | 4/1989 | Huber | 714/38 |
| 4,980,823 | 12/1990 | Liu | 711/136 |
| 5,113,511 | 5/1992 | Nelson et al. | 711/104 |
| 5,287,487 | 2/1994 | Priem et al. | 711/204 |
| 5,392,414 | 2/1995 | Yung | 711/128 |
| 5,499,355 | 3/1996 | Krishnamohan et al. | 711/137 |
| 5,710,906 | 1/1998 | Ghosh et al. | 711/146 |
| 5,778,436 | 7/1998 | Kedem et al. | 711/137 |
| 5,860,106 | 1/1999 | Domen et al. | 711/137 |

*Primary Examiner*—B. James Peikari
*Attorney, Agent, or Firm*—Nixon & Vanderhye P.C.

[57] ABSTRACT

A data processing system having a processor core 4, a memory management unit 6 and a cache memory 8 uses the memory management unit 6 to produce a confirm signal C that indicates that a memory access request will be processed no further, i.e. the outcome is fully determined. The next memory access request is initiated prior to this confirm signal C being available and accordingly if the confirm signal C indicates a result different to that predicted, then a stall of the system is required until the non-confirmed memory access request can be dealt with. A result prediction unit 14 is responsive to one or more variable signals characterising the memory access request and serves to produce a result prediction signal RP indicating in which of a plurality of ways said memory access requested will complete, which is available before the confirm signal C, and upon which an appropriate predicted next memory access request may be prepared for use if the confirm signal C indicates that the memory access request will be processed no further. In this way, the performance impact of late indication of partial processing can be reduced, particularly in the case of common and relatively easy to predict circumstances such as cache storage line wrap.

12 Claims, 3 Drawing Sheets

MEMORY ACCESS REQUEST RESULT PREDICTION PRIOR TO CONFIRM SIGNAL GENERATION

BACKGROUND OF THE INVENTION

1. Field of the Invention

This invention relates to the field of data processing. More particularly, this invention relates to data processing in systems in which a memory access request that is initiated within a processor core and is subject to a later confirm signal that indicates that the memory access request will be processed no further and whether the memory access request to the cache memory 8 will be one of (a) at least partially completed or (b) fail.

2. Description of the Prior Art

It is known to provide data processing apparatus having a processor core serving to initiate memory access requests. With the increase in speed of operation of such systems, a constraining factor has been the need to determine whether a memory access request is valid and will complete properly (e.g. will not exceed the capabilities of the system or cause some sort of system violation or abort) before that memory access request is initiated.

In order to relax the above constraint, data processing apparatus such as the ARM700 family of microprocessors (produced by Advanced RISC Machines Limited of Cambridge, Great Britain) have used a technique in which memory access requests have been initiated before the check to determine whether or not they will properly complete has produced a result with the safeguard that the result of the memory access request will not be allowed to change the state of the system until the result of the determination of whether or not the memory access request is properly completed is available. If the result of the determination indicates that the memory access request is not properly completed, then further memory access requests are delayed by stopping the processor core clock whilst other parts of the system take appropriate recovery action. The time penalty incurred by the need to undo the results of inappropriately initiating memory access requests is not too great providing the frequency of occurrence of improper completion is relatively low and so is outweighed by the ability to speed up the overall processing cycle by not having to wait for the result of the determination before initiating the operation.

It is an object of the invention to provide increased processing performance in a data processing system in which the memory access requests are subject to confirmation to indicate that a memory access request will be processed no further.

SUMMARY OF THE INVENTION

Viewed from one aspect the invention provides apparatus for processing data, said apparatus comprising:

(i) a memory;

(ii) a processor core for initiating a memory access request that is subject to subsequent confirmation in response to a confirm signal that indicates that said memory access request has completed such that no further response will result from said memory access request;

(iii) a confirm signal generator for determining within a confirm signal delay period which confirm signal should be generated, said processor core being responsive to a confirm signal indicating a non-completed memory access request to recover said data processing apparatus to a state that is uncorrupted by said non-completed memory access request;

(iv) a result prediction circuit responsive to one or more variable signals indicative of characteristics of said memory access request for determining within a result prediction delay period, which finishes before said confirm signal delay period, a prediction as to in which of a plurality of ways said memory access request will complete and for generating a result prediction signal, said processor core being responsive to said result prediction signal to prepare a predicted next memory access request for execution if said confirm signal indicates completion of said memory access request.

The confirm signal indicates that a memory access request has been finished with (completed) by the memory system such that no further variable response will result from the memory access request, i.e. the outcome is fully determined even if the data words have not yet been returned or sent. A completed memory access request may have been completely successful (all request words returned), partially successful (some, but not all, requested words returned) or failed (no requested words returned).

The invention utilises a result prediction circuit that is responsive to the nature of the memory access request to determine a prediction as to which of a plurality of outcomes will result from said memory access request, e.g. the memory access request is fully successful if it returns all of the data requested or partially successful if it only returns some of the data requested. Since this prediction need not be a definitive answer it can operate upon a subset of the parameters of the memory access request dealing with the common ways partial success may arise and be available for use earlier than the confirm signal that may give the definitive answer. The preparation of a suitable predicted next memory access request in advance of the confirm signal being issued provides a number of benefits. At the simplest level, the advance preparation of a suitable memory access request following partial success allows the possibility for the recovery following partial success to take place more rapidly and so allow data processing to re-commence more quickly. At a more sophisticated level, the prior art technique treated all potential reasons for other than full success in the same manner and would incur essentially the same delay on occurrence of any of these reasons. Accordingly, if a particular reason for other than full success was relatively common, then this would have a significant impact on processing performance. However, the result prediction circuitry of the present invention allows the possibility that certain relatively common reasons for other than full success can be treated differently with dedicated circuitry to determine whether or not they are present and so allow the earlier preparation of a suitable predicted next memory access request that thereby at least partially mitigates the performance impact of these relatively common occurrences.

Whilst the confirm signal generator could take any number of different forms within the system, in preferred embodiments of the invention said confirm signal generator includes a memory management unit.

Memory accesses by a data processing core that seek to either read or write data or instructions within a memory are very common operations within a data processing system. There is a considerable degree of flexibility and variation in the way in which the memory of a data processing system may be configured, both in terms of its hardware configuration and in terms of the particular way it may be configured under software control at a given time (as controlled by the memory management unit), with the result that memory accesses are checked to determine that they can and will be validly performed. As memory access speeds are performance critical in a data processing system, the technique of the present invention that helps alleviate a potential bottleneck in performance is highly advantageous.

Memory accesses may be subject to non-completion (i.e. being not yet fully processed) for a number of possible reasons. An example would be that a particular memory area is non-cacheable and accordingly a relatively slow main memory access is required that has not yet returned its results.

In preferred embodiments of the invention said memory access request, if fully successful, results in transfer of a plurality of data words between said processor core and said memory, preferably via time division multiplexing on a data bus.

Such multi-word access requests are used to boost system performance but introduce the complication that not all of the data words (either instructions or variable data) may in fact be returned due to hardware, mode or other considerations.

In these circumstances, preferred embodiments of the invention are such that said result prediction signal predicts whether or not all of said plurality of data words will be transferred.

Using the result prediction signal to indicate whether or not all of the plurality of data words will be transferred has the advantage of allowing an appropriate follow-up memory access request to be initiated as soon as possible (e.g. to either retrieve the data words that were not previously retrieved or to take an appropriate exception or other action).

Whilst mode considerations may determine that a memory access request has not finished being processed by the time the confirm signal is generated, another potential and relatively common cause of non-completion occurs in embodiments of the invention in which said memory is divided into memory regions such that a memory access request that encompasses two memory regions cannot be completed in due time.

For efficiency of operation and manufacture it is common to divide a memory space into regions. A result of this is that adjacent addresses in the address space may turn out to have quite different physical storage locations within the hardware that prevent both regions being accessed by a single memory access request.

Whilst memory region boundary problems are comparatively infrequent when accessing main memory, the problems are more acute in embodiments in which said memory is a cache memory and said memory regions are cache lines.

A high speed cache memory is commonly used to boost system performance. A feature of cache memory is that whilst the data within a given cache line can often be accessed by a single memory access request, this is much more difficult when more than one cache line is involved. Furthermore, a given cache line presents a memory region that is much smaller than a memory region in main memory and so the occurrence of memory access requests that span more than one cache line (encompass two memory regions) is much more probable. For example, if a cache line holds four data words and a memory access request that would normally encompass two data words is made at a random position within the cache memory, then 25% of such memory access requests will span two cache lines and so be unable to be fully completed by the single memory access request. This represents a high probability reason for other than full success of a memory access request and so particularly benefits from the result prediction circuitry of the invention.

In order to be responsive to partial success as a result of encompassing two memory regions, preferred embodiments of the invention are such that said result prediction circuit is responsive to signals of said memory access request specifying an address to be accessed within said memory.

Furthermore, in a memory that is divided into abutting contiguous regions preferred embodiments of the invention are such that said result prediction circuit comprises combinatorial logic responsive to those low order bit of said address from which a result as to whether or not said memory access request encompassed two memory regions can be determined.

Having the result prediction circuit formed of combinatorial logic responsive to the low order bits of an address allows a high speed mechanism for producing a prediction as to whether or not the memory access request will inappropriately encompass two memory regions. In this way, an appropriate predicted next memory access request comprising the accessing of the second memory region for those data words not already accessed can be prepared in advance and be ready for use as soon as the confirm signal is available. It will be understood that the predicted next memory access request is not guaranteed to take place since the confirm signal is the definitive controlling factor. It may be that a given memory access request will be other than fully completed for more than one reason and that any predicted next memory access request prepared upon the basis of the prediction signal in fact is inappropriate in view of the final result of the confirm signal. In such circumstances, the predicted next memory access request may not be executed and a recovery of the memory access system may take place. Nevertheless, the prediction circuit provides a performance advantage since statistically common reasons for other than full success may be dealt with more expeditiously and, if this is not possible, then the performance lost is not any greater than would otherwise be the case.

Viewed from another aspect the present invention provides a method of processing data with a data processing apparatus, said method comprising the steps of:

(i) initiating, using a processor core coupled to a memory, a memory access request that is subject to subsequent confirmation in response to a confirm signal that indicates that said memory access request has been completed such that no further response will result from said memory access request;

(ii) determining within a confirm signal delay period which confirm signal should be generated, said processor core being responsive to a confirm signal indicating a non-completed memory access request to recover said data processing apparatus to a state that is uncorrupted by said non-completed memory access request;

(iv) in response to one or more variable signals indicative of characteristics of said memory access requests for determining within a result prediction delay period, which finishes before said confirm signal delay period, a prediction as to in which of a plurality of ways said memory access request will complete and for generating a result prediction signal, said processor core being responsive to said result prediction signal to prepare a predicted next memory access request for execution if said confirm signal indicates completion of said memory access request.

The above, and other objects, features and advantages of this invention will be apparent from the detailed description of an illustrative embodiment which is to be read in conjunction with the accompanying drawings.

DETAILED DESCRIPTION OF PREFERRED EMBODIMENTS

Figure 1:
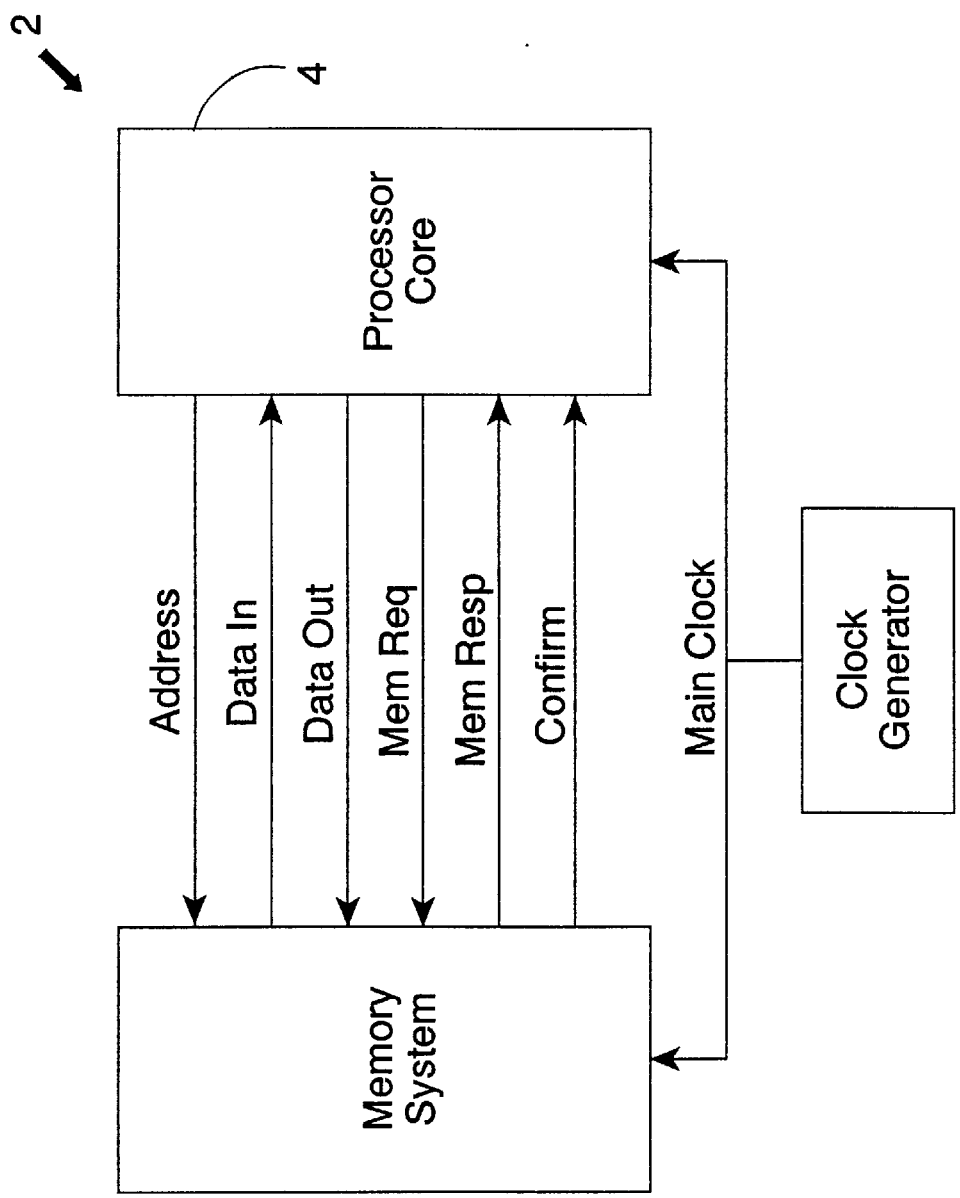
FIG. 1 schematically illustrates a data processing system incorporating a memory system.
Figure 2:
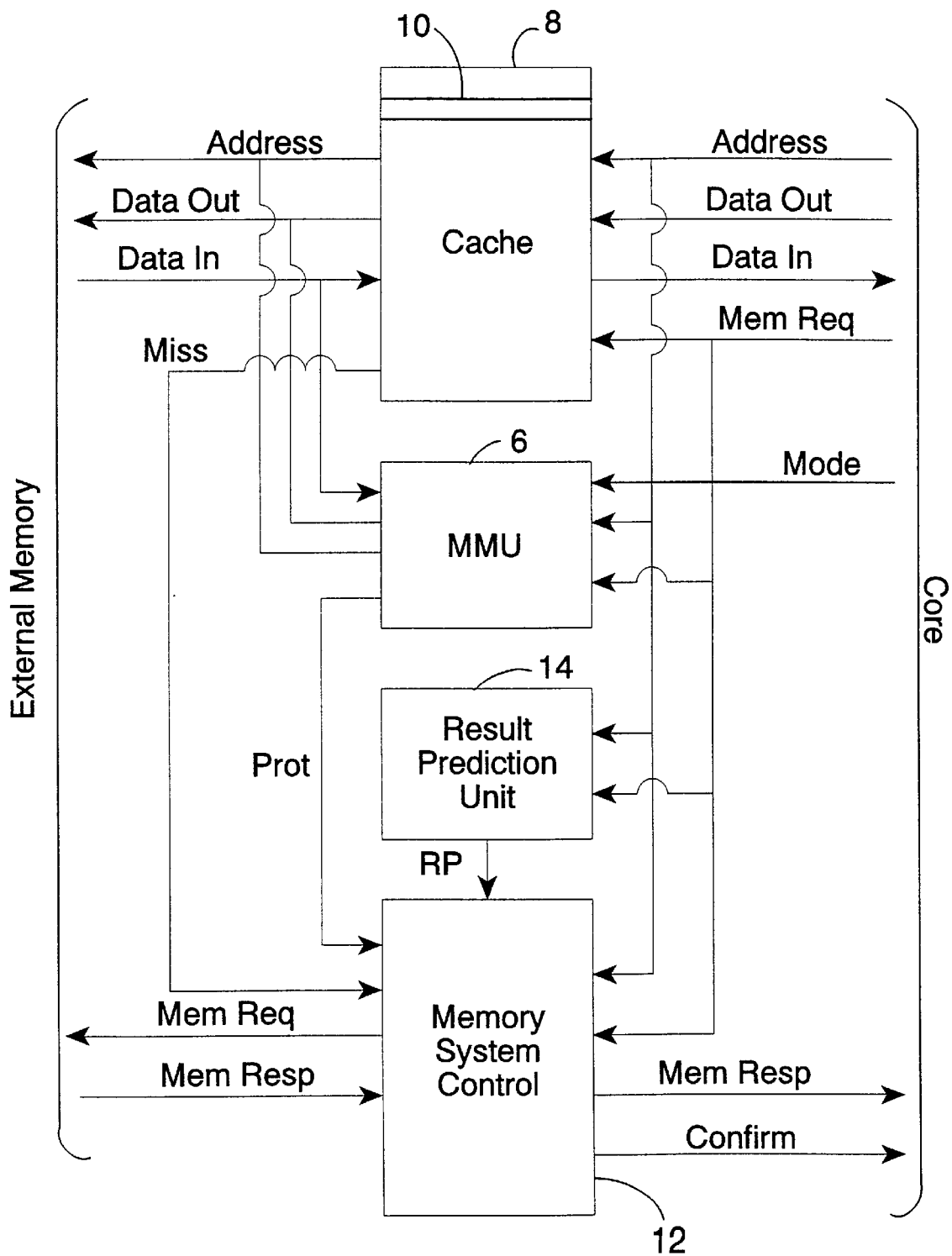
FIG. 2 illustrates the memory system of FIG. 1 in more detail.

FIGS. 1 and 2 shows a data processing system 2 comprising a processor core 4, a memory management unit 6 and a cache memory 8. The memory access request with which this embodiment of the present invention deals is a cache memory read for two sequential words that is subject to a protection check by the memory management unit 6.

The cache memory 8 can be considered as comprising a plurality of memory regions each formed of a cache line 10 that stores four data words. The data processing core 4 issues signals including an address and a memory access request to a memory system control logic unit 12 that is responsible for controlling the recovery of the data words from the cache memory 8. The memory access request also passes to the cache memory 8 that is searched to determine whether or not the cache memory 8 holds the required data. If the cache memory 8 does not hold the required data, then the memory access request must be passed onto the main memory under control of the memory system control logic unit 12 and overall slower operation results. This is indicated by a miss signal returned to the memory system control logic unit 12.

If the cache memory 8 does include the data being accessed, then a particular cache line 10 will be activated for reading within the cache memory 8. The memory access request specifies a particular memory address and, in this example, expects to receive two data words in return, i.e. the data word stored at the specified memory address and the following data word. This is highly efficient since statistically sequential memory access requests are highly probable and so if two data words are recovered in response to a single memory access request then very often the second word will be required and used and the need for a further data access request avoided.

However, since a particular cache line 10 only stores four words of data, if the first word to be accessed is the last word within the cache line 10, then the subsequent data word will not be present in that cache line 10 and cannot be returned in due time. This can be indicated back to the memory system control logic unit 12 by an appropriately timed variation in the miss signal. In order to deal with this, the memory system control logic unit 12 should control the core 4 to store the first returned data word but to ignore whatever signal values are present on the data bus at the time when the second data word would be expected to be present on the data bus. Furthermore, result prediction unit 14 prepares a result prediction that is passed to the core 4 so that it can prepare a predicted next memory access request specifying the address of the data word that was not returned since this is the most probable subsequent desired action. The calculation of the address required for such a subsequent memory access request and the required number of words takes a finite amount of time and so the sooner this can be started the faster overall operation of the system may be allowed.

In order to predict as soon as possible whether or not the memory access request will be fully successful, the address issued from the processor core 4 is passed to a result prediction unit 14. The result prediction unit 14 can simply comprise an AND gate responsive to two low order bits of the address that control whether or not a cache boundary is spanned. These two low order bits will always be a 1 for an address in the last word position of a cache line 10 and accordingly when the output of the AND gate is a 1 (i.e. the result prediction signal RP), this indicates that a two-word memory access request will at the very least be only partially successful due to a failure to return the second data word at the appropriate time.

In parallel with the determination of the result prediction signal RP by the result prediction unit 14, the memory management unit 6 is responsive to the full address as well as other signals from the processor core 4 (e.g. mode signals) to determine a protection signal Prot that indicates that a memory access request breaks the setup memory protection. This more complex determination accessing stored data, such as memory mapping data, within the memory management unit 6 takes longer to be returned and so is not available to the memory system control logic unit 12 until much later in the cycle. The memory system control logic unit 12 uses the protection signal Prot as well as other signals specifying the memory access request to determine a confirm signal indicating the outcome is now fixed.

If a cache line wrap is detected by the result prediction unit 14 and the memory management unit 6 does not produce any other reason why the memory access request should not partially succeed in this way, then the follow-up memory access request prepared in advance by the core 4 is able to be immediately issued on the next data processing cycle. However, should the memory management unit 6 indicate some factor that was not predicted and has not already been compensated for, then the memory system control logic unit 12 operates with the core 4 to recover to a state uncorrupted by the non-completion.

Figure 3:
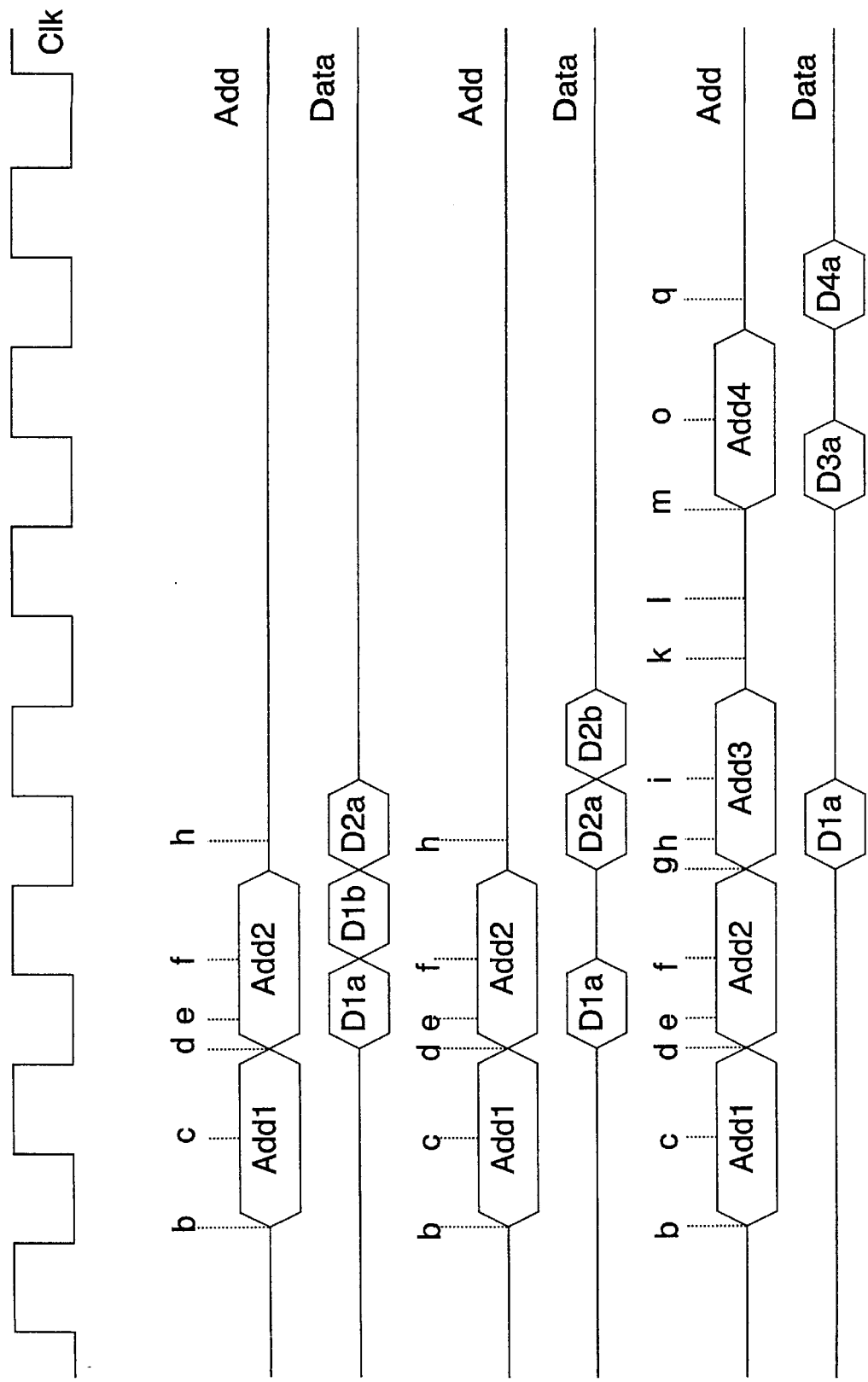
FIG. 3 schematically illustrates various signals within the system of FIGS. 1 and 2.

Consider the following examples of a memory access request (an ARM LDM instruction) for three data words in sequence as illustrated in FIG. 3. The examples show different circumstances that may arise.

(1) LDM address is at the start of a cache line, and that cache line is in the cache (upper Add and Data lines of FIG. 3).

| Memory Access Request | Result Prediction Signal(s) | Confirm Signal | Data Returned |
|---|---|---|---|
| Phase 1 | Unknown (a) | | |
| Phase 2 Load 2 words (b) | | Confirmed (a) | |
| Phase 1 | 2 words (c) | | |
| Phase 2 Load 1 word (d) | | Confirmed (e) | 1st word |
| Phase 1 | 1 word (f) | | 2nd word |
| Phase 2 Unknown (g) | | Confirmed (h) | 3rd word |
| Phase 1 | Unknown (g) | | |

Notes:
(a) These don't affect anything that is going on, since they relate to a different instruction. I only know that they were confirmed because the processor core wouldn't have advanced to this LDM if they hadn't been.
(b) This doesn't depend on the previous result prediction signals, since they relate to a completely different set of accesses. (Even though it doesn't depend on them, though, it would have been ignored if the result prediction signals hadn't been confirmed, because the memory system would still be busy with the previous request.)
(c) Since not at the end of a cache line.
(d) "Assuming" the result prediction signals are correct, we want one more word. (Address is 2 words up on first address.)
(e) Result prediction signals are correct, and so we will pay attention to the new request.
(f) Since only one was requested.
(g) May depend on next instruction, may be prefetching more instructions, may be for nothing at all. Which depends on details of both the exact implementation of the processor core and of the instruction stream it is executing.

-continued

| Memory Access Request | Result Prediction Signal(s) | Confirm Signal | Data Returned |
|---|---|---|---|

(h) Result prediction signals are correct (and so we will pay attention to the freshly generated request).

(2) LDM address is at the end of a cache line, and both that cache line and the next are in the cache (middle Add and Data lines of FIG. 3).

| Memory Access Request | | Result Prediction Signal(s) | Confirm Signal | Data Returned |
|---|---|---|---|---|
| Phase 1 | | Unknown (a) | | |
| Phase 2 | Load 2 words (b) | | Confirmed (a) | |
| Phase 1 | | 1 word (c) | | |
| Phase 2 | Load 2 words (d) | | Confirmed (e) | 1st word |
| Phase 1 | | 2 words (f) | | |
| Phase 2 | Unknown (g) | | Confirmed (h) | 2nd word |
| Phase 1 | | Unknown (g) | | 3rd word |

Notes:
(a),(b) See example (1).
(c) Since at the end of a cache line.
(d) "Assuming" the result prediction signals are correct, we want two more words. (Address is one word up on first request's address.)
(e) Result prediction signals are correct, and so we will pay attention to the new request.
(f) Since the new request is from the start of the second cache line.
(g) See example (1).
(h) Result prediction signals are correct (and so we will pay attention to the freshly generated request).

(3) LDM address would be at the start of a cache line (i.e. is divisible by 16), but is in an uncachable area of memory (bottom Add and Data lines of FIG. 3):

| Memory Access Request | | Result Prediction Signal(s) | Confirm Signal | Data Returned |
|---|---|---|---|---|
| Phase 1 | | Unknown (a) | | |
| Phase 2 | Load 2 words (b) | | Confirmed (a) | |
| Phase 1 | | 2 words (c) | | |
| Phase 2 | Load 1 word (d) | | Unconfirmed (e) | |
| Phase 1 | | 1 word (f) | | |
| Phase 2 | Load 2 words (g) | | Confirmed (h) | 1st word |
| Phase 1 | | 2 words (i) | | |
| Phase 2 | Unknown (j) | | Unconfirmed (k) | |
| Phase 1 | | 1 word (l) | | |
| Phase 2 | Load 1 word (m) | | Confirmed (n) | 2nd word |
| Phase 1 | | 1 word (o) | | |
| Phase 2 | Unknown (p) | | Confirmed (q) | 3rd word |

Notes:
(a),(b) See example (1).
(c) Since not apparently at the end of a cache line.
(d) "Assuming" the result prediction signals are correct, we want one more word. (Address is 2 words up on first address.)
(e) Result prediction signals are incorrect, because we have to go to main memory to satisfy request, and main memory can only supply one word. The just-generated response will be ignored.
(f) This is the corrected response to the initial request (note (b) not an initial response to the ignored request (note (d)). Note also that there could be several cycles of unconfirmed responses before this confirmed one-i.e. this is just one example of what might happen, not the only possibility.
(g) "Assuming" the new result prediction signals are correct, we now want two more words. (Address is 1 word up on first address.)

-continued

| Memory Access Request | Result Prediction Signal(s) | Confirm Signal | Data Returned |
|---|---|---|---|

(h) Result prediction signals are correct, and so we will pay attention to the new request.
(i) Since still not apparently at the end of a cache line.
(j) "Assuming" the result prediction signals are correct, this instruction doesn't want to do anything more-see example (1) note (g) about what appears here.
(k) Similar to note (e).
(l) Similar to note (f).
(m) "Assuming" corrected result prediction signals are now right, we now only want one more word. (Address is 2 words up on first address.)
(n) Similar to note (g).
(o) Since only one was requested.
(p) See example (1) note (g).
(q) Result prediction signals are correct (and so we will pay attention to the freshly generated request).

It has been found that it is statistically common that a sequence of many cache lines will be read in a burst. Thus, whilst the start of the burst of cache reading may be mis-aligned with the cache line wrap boundary, this will be dealt with reduced performance impact by the predicted fail arrangement discussed above and thereafter the subsequent memory access requests for that burst will be aligned with the cache storage line wrap boundaries resulting in no further predicted fails.

Although an illustrative embodiment of the invention has been described in detail herein with reference to the accompanying drawings, it is understood that the invention is not limited to this precise embodiment, and that various changes and modifications can be affected therein by one skilled in the art without departing from the scope and spirit of the invention as defined by the appended claims.

I claim:

1. Apparatus for processing data, said apparatus comprising:
   (i) a memory;
   (ii) a processor core for initiating a memory access request that is subject to subsequent confirmation in response to a confirm signal that indicates that said memory access request has completed such that no further variable response will result from said memory access request;
   (iii) a confirm signal generator for determining within a confirm signal delay period which confirm signal should be generated, said processor core being responsive to a confirm signal indicating a non-completed memory access request to recover said data processing apparatus to a state that is uncorrupted by said non-completed memory access request;
   (iv) a result prediction circuit responsive to one or more variable signals indicative of characteristics of said memory access request for determining within a result prediction delay period, which finishes before said confirm signal delay period, a prediction as to in which of a plurality of ways said memory access request will complete and for generating a result prediction signal, said processor core being responsive to said result prediction signal to prepare a predicted next memory access request for execution if said confirm signal indicates completion of said memory access request.

2. Apparatus for processing data as claimed in claim 1, wherein said confirm signal generator includes a memory management unit.

3. Apparatus for processing data as claimed in claim 1, wherein said memory access request, if fully performed, results in transfer of a plurality of data words between said processor core and said memory.

4. Apparatus for processing data as claimed in claim 3, wherein said plurality of data words are transferred by time division multiplexing or a data bus.

5. Apparatus for processing data as claimed in claim 3, wherein said result prediction signal predicts how many of said plurality of data words will be transferred.

6. Apparatus for processing data as claimed in claim 3, wherein said memory is divided into memory regions such that a memory access request that encompasses two memory regions cannot be fully completed in due time.

7. Apparatus for processing data as claimed in claim 5, wherein said memory is a cache memory and said memory regions are cache lines.

8. Apparatus for processing data as claimed in claim 1, wherein said result prediction circuit is responsive to signals of said memory access request specifying an address to be accessed within said memory.

9. Apparatus for processing data as claimed in claim 7, wherein said result prediction circuit comprises combinatorial logic responsive to those low order bit of said address from which a result as to whether or not said memory access request encompassed two memory regions can be determined.

10. Apparatus for processing data as claimed in claim 5, wherein said predicted next memory access request includes those data word that could not be transferred in response to said memory access request that encompassed two memory regions.

11. Apparatus for processing data as claimed in claim 1, wherein said confirm signal generator is responsive to a full set of signals indicative of characteristics of said memory access request when determining whether said memory access request has completed whereas said result prediction circuit is responsive to responsive to a partial set of signals indicative of characteristics of said memory access request when preparing said predicted next memory access request.

12. A method of processing data with a data processing apparatus, said method comprising the steps of:

(i) initiating, using a processor core coupled to a memory, a memory access request that is subject to subsequent confirmation in response to a confirm signal that indicates that said memory access request has been completed such that no further variable response will result from said memory access request;

(ii) determining within a confirm signal delay period which confirm signal should be generated, said processor core being responsive to a confirm signal indicating a non-completed memory access request to recover said data processing apparatus to a state that is uncorrupted by said non-completed memory access request;

(iii) in response to one or more variable signals indicative of characteristics of said memory access requests for determining within a result prediction delay period, which finishes before said confirm signal delay period, a prediction as to in which of a plurality of ways said memory access request will complete and for generating a result prediction signal, said processor core being responsive to said result prediction signal to prepare a predicted next memory access request for execution if said confirm signal indicates completion of said memory access request.

\* \* \* \* \*